(12) United States Patent
Gupta

(10) Patent No.: US 9,131,032 B1
(45) Date of Patent: Sep. 8, 2015

(54) METHODS AND IMPROVEMENTS IN UICC POLLING MECHANISM FOR UICC MANAGEMENT

(71) Applicant: CELLCO PARTNERSHIP, Basking Ridge, NJ (US)

(72) Inventor: Praveen K. Gupta, Pleasanton, CA (US)

(73) Assignee: Cellco Partnership, Basking Ridge, NJ (US)

( * ) Notice: Subject to any disclaimer, the term of this patent is extended or adjusted under 35 U.S.C. 154(b) by 26 days.

(21) Appl. No.: 14/202,709

(22) Filed: Mar. 10, 2014

(51) Int. Cl.
*H04L 29/12* (2006.01)
*G06F 17/30* (2006.01)
*H04W 8/20* (2009.01)

(52) U.S. Cl.
CPC ...... *H04L 61/6054* (2013.01); *G06F 17/30887* (2013.01); *H04L 61/2503* (2013.01); *H04W 8/20* (2013.01)

(58) Field of Classification Search
CPC ............ H04W 76/02; H04W 63/0853; H04W 63/123; H04W 61/6054; H04W 61/2503
See application file for complete search history.

(56) References Cited

U.S. PATENT DOCUMENTS

2007/0220498 A1* 9/2007 Madsen ......................... 717/140

OTHER PUBLICATIONS

S. Thomson et al., "DNS Extensions to Support IP Version 6," Network Working Group, Oct. 2013, <https://www.ietf.org/rfc/rfc3596.txt>.

A. Durand et al., "Operational Considerations and Issues with IPv6 DNS," Network Working Group, Apr. 2006, <https://www.ietf.org/rfc/rfc4472.txt>.
P. Mockapetris, "Domain Names—Concepts and Facilities," Network Working Group, Nov. 1987, <https://www.ietf.org/rfc/rfc1034.txt>.
P. Mockapetris, "Domain Names—Implementation and Specification," Network Working Group, Nov. 1987, <https://www.ietf.org/rfc/rfc1035.txt>.
S. Thomson et al., "DNS Extensions to Support IP version 6," Network Working Group, Dec. 1995, <https://www.ietf.org/rfc/rfc1886.txt>.
R. Draves, "Default Address Selection for Internet Protocol version 6 (IPv6)," Network Working Group, Feb. 2003, <https://www.ietf.org/rfc/rfc3484.txt>.
Smart Cards; Card Application Toolkit (CAT) (Release 10); ETSI TS 102 223 V10.6.0, Mar. 2012.

\* cited by examiner

*Primary Examiner* — Curtis Odom

(57) ABSTRACT

Systems and methods for handling an OPEN CHANNEL command from a universal integrated circuit card (UICC) of a mobile device are disclosed. In some implementations, a mobile device hosting a UICC receives, from the UICC, an initiation of an OPEN CHANNEL command with a uniform resource locator (URL) of a subscriber identity module over the air (SIMOTA) server. The mobile device signals for attempting to resolve the URL to an Internet Protocol (IP) address. Upon successfully resolving the URL to the IP address, the mobile device obtains the IP address associated with the SIMOTA server, connects to the SIMOTA server using the IP address, and returns a successful TERMINAL RESPONSE to the UICC. Upon failing to resolve the URL to the IP address, the mobile device returns an unsuccessful TERMINAL RESPONSE to the UICC.

20 Claims, 3 Drawing Sheets

METHODS AND IMPROVEMENTS IN UICC POLLING MECHANISM FOR UICC MANAGEMENT

BACKGROUND

A mobile device, for example a mobile phone or tablet computer, may include a universal integrated circuit card (UICC) that is removable from the mobile device and associates the mobile device with a user account of a cellular carrier. The memory of the UICC may include cellular carrier software from the cellular carrier of the UICC, which may be installed on the UICC during UICC manufacturing or activation with the cellular carrier and occasionally updated by the cellular carrier. According to some schemes, the UICC stores an Internet Protocol (IP) address of a Subscriber Identity Module Over The Air (SIMOTA) server that is accessed by the mobile device for installing or updating the cellular carrier software. One drawback of these schemes is that the IP address of the SIMOTA server specified by the UICC may not correspond to the optimal SIMOTA server. For example, this may be the case when the specified SIMOTA server is no longer operational, offline, overloaded, geographically distant from the mobile device, etc. As the foregoing illustrates, a new approach for installing or updating cellular carrier software via a SIMOTA server may be desirable.

BRIEF DESCRIPTION OF THE DRAWINGS

The drawing figures depict one or more implementations in accordance with the present teachings, by way of example only, not by way of limitation. In the figures, like reference numerals refer to the same or similar elements.

DETAILED DESCRIPTION

Figure 1:
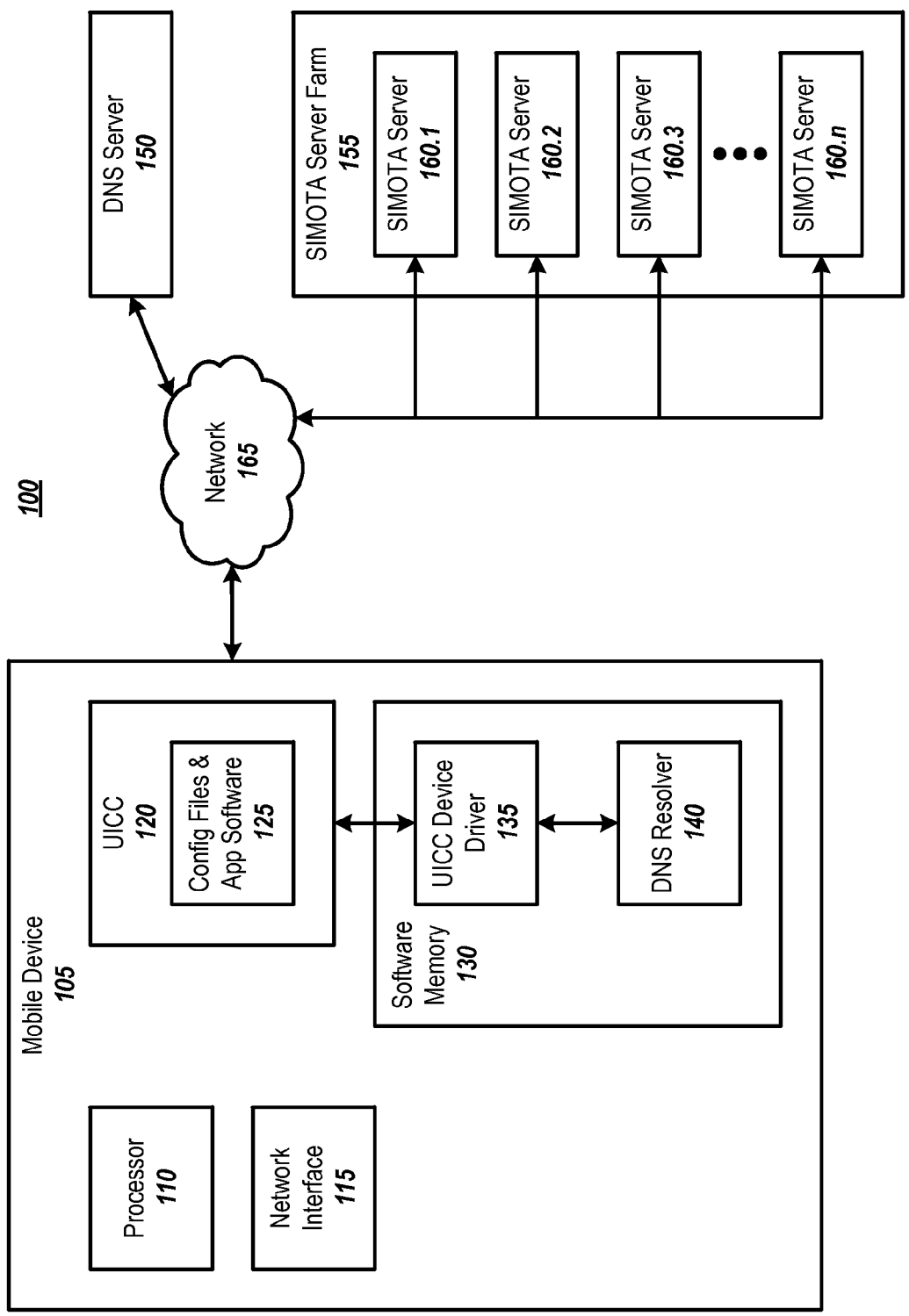
FIG. 1 illustrates an exemplary system for handling an OPEN CHANNEL command from a UICC of a mobile device.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The subject technology provides techniques for handling an OPEN CHANNEL command from a universal integrated circuit card (UICC) of a mobile device. As used herein, the phrase "mobile device" may encompass any mobile computing device, terminal, or user equipment, for example, a cellular phone, smartphone, or tablet computer. One standard setting institute in the telecommunications industry is the European Telecommunications Standards Institute (ETSI). According to the March 2012 ETSI standard for "Smart Cards: Card Application Toolkit (CAT) (Release 10)," i.e., ETSI TS 102 223 V10.6.0, which is available at www.etsi.org/deliver/etsi_ts/102200_102299/102223/10.06.00_60/ts_102223v100600p.pdf, accessed on Dec. 9, 2013, and incorporated herein by reference, a domain name service (DNS) resolver is implemented in the universal integrated circuit card (UICC). This may lead to operational problems for creating a device-triggered OPEN CHANNEL connection from the UICC to the Subscriber Identity Module Over The Air (SIMOTA) server. For example, the DNS resolver implemented in the UICC may direct the mobile device to attempt to connect with a SIMOTA server that is no longer operational, offline, overloaded, geographically distant from the mobile device, etc.

The DNS resolver functionality may be implemented at a processor or a memory of the mobile device and not at the UICC. To this end, the DNS resolver functionality may be eliminated from the UICC. As a result, a UICC-initiated connection may use a DNS resolver of the mobile device to an optimal SIMOTA server, the optimal SIMOTA server being selected based on factors such as network connection speed, server load, etc. Such an embodiment may prevent or resolve current SIMOTA operational issues in which the UICC connects with an inactive SIMOTA server before connecting to the correct SIMOTA server. The UICC connection may be used for activation or polling of the mobile device or for handling an OPEN CHANNEL command from a UICC of the mobile device. In some cases, no DNS server address may be stored in the UICC and/or no SIMOTA server address may be stored in the UICC. In other words, the UICC may lack DNS resolver functionality.

Some implementations of the subject technology may include the following modifications to the above-referenced March 2012 ETSI standard for "Smart Cards: Card Application Toolkit (CAT) (Release 10)," i.e., ETSI TS 102 223 V10.6.0. A new bit may be added as part of TERMINAL PROFILE to indicate that the terminal/mobile device may perform DNS resolution for UICC connection requests. The terminal profile of the mobile device may include bit(s) that indicate that the mobile device has a local DNS-resolver capability. For example—one bit of the terminal profile can be used to indicate that mobile-device DNS-resolver can be used for IPv4 Server-address only. Another bit can be used to indicate local DNS-resolver 140 capability to resolve DNS-name into IPv6/IPv4 Server IP address. Another TERMINAL PROFILE bit can be used to indicate that the mobile device has capability to support RFC-3484 for dual-stack destination servers. The UICC connection requests may include OPEN CHANNEL requests with an indication to use the DNS resolver of the mobile device and include a destination address in a form of a uniform resource locator (URL). The OPEN CHANNEL requests may be accepted by the mobile device. The destination address definition (in ETSI TS 102 223 V10.6.0 Section 5.8), which (in the March 2012 version) does not include a URL, may be modified to include the URL as a value. The modification of the destination address may be as set forth in Table 1, in which the address has a length of X bytes.

TABLE 1

| Byte(s) | Description | Length |
| --- | --- | --- |
| 1 | Other address tag | 1 |
| 2 | Length X | 1 |
| 3 | Type of address | 1 |
| 4 to X + 2 | Address | X-1 |

In addition, a new type of address definition may be added to the above-referenced March 2012 ETSI standard for "Smart Cards: Card Application Toolkit (CAT) (Release 10)," i.e., ETSI TS 102 223 V10.6.0. The new type of address definition may correspond to '87'=URL-IPv4, '115'=URL-IPv6 or '117'=URL-IPv6v4, or any other value in place of 87, 115 or 117. The UICC may use URL-IPv6 when TERMINAL PROFILE indicates that local DNS-resolver is capable of supporting DNS-name resolution into an IPv6/IPv4 address. URL-IPv4v6 type may, in some but not all cases, only be used if TERMINAL PROFILE indicates that the mobile device/terminal is capable of supporting RFC-3484 for IP-connection management for dual-stack servers and prioritize IPv6 connections when destination-server can support both IPv6/IPv4 IP-addresses. This type of address may be acceptable only when "UICC/terminal interface transport level" field in the OPEN CHANNEL request is set to Transmission Control Protocol ("TCP") or User Datagram Protocol ("UDP"). As an example, coding of Type of address=87, Address=simota.operator.com may mean that the UICC is looking for an IPv4 connection to simota.operator.com server. In this case, the actual SIMOTA-server IPv4 address may be returned in the TERMINAL RESPONSE. As another example, Type of Address=117, Address= simota.operator.com may mean that UICC may use an IPv4 or an IPv6 address of SIMOTA-server and prefer the IPv6 address for dual-stack IPv4/IPv6 SIMOTA servers. In this case, TERMINAL RESPONSE may return the actual IP-address used for connection to the SIMOTA server based on DNS-responses.

When the URL-type is received as the "type of address," the address field may be a URL of size/length X, as indicated in the length field. The UICC may send to the terminal/mobile device an OPEN CHANNEL request with a destination address having the URL as its value. The terminal/mobile device may convert the URL received in the OPEN CHANNEL request into a destination Internet Protocol (IP) address by using the DNS resolver of the mobile device. In this case, the UICC relies on the DNS server address used in the mobile device and that is based on the DNS server configuration received during network-connection used for serving the UICC-traffic. Based on the URL address option used, i.e., URL-IPv4, URL-IPv6 or URL-IPv6v4, the DNS resolver may request the target server (URL server) address as IPv4 address, IPv6 address or RFC-3484 based destination IP-address of IPv6 as priority over IPv4. The mobile device may reject the OPEN CHANNEL request parameter of URL-IPv6 or URL-IPv4v6 if the network bearer IP address assigned to the mobile device is IPv4 only. When the mobile device IP address is IPv4, the IPv4 destination-server address may be used for IP connection. The mobile device may use the DNS-resolved destination address (e.g., IP address) to connect to the server before sending a TERMINAL RESPONSE to the UICC. As a result of resolving the URL to a destination IP address and then using the resolved destination IP address to connect to the server, the mobile device is more likely to connect to an operational and faster server, rather than a non-operational or slower server.

When the mobile device issues a successful or an unsuccessful TERMINAL RESPONSE for an OPEN CHANNEL command, the TERMINAL RESPONSE contains a Bearer description data object. When the mobile device returns a successful TERMINAL RESPONSE, the Bearer description object may include an IP address type (IPv4 or IPv6) and, optionally, provide a destination IP address (IPv4 or IPv6, based on the IP address type) used for SIMOTA-server destination The modification of the Bearer description object may be defined, in some examples, as stated in Table 2 below:

TABLE 2

| Byte(s) | Description | Length |
|---|---|---|
| 1 | Bearer description tag | 1 |
| 2 | Length (X + 1) | 1 |
| 3 | Bearer type | 1 |
| 4 to X + 2 | Bearer parameters | X |

Coding of the Bearer Type:
  '0B'—IPv4 destination address using 3GPP bearer (E-UTRAN/mapped UTRAN packet service)
  '0C'—IPv6 destination address using 3GPP bearer (E-UTRAN/mapped UTRAN packet service)
Coding of the Bearer Parameters:
  Destination IP address—IPv4/IPv6 destination address used in IP connection to destination server
As an example, a bearer-description of a terminal response may contain an actual IPv4 or IPv6 address of a SIMOTA-server that is used in an OPEN CHANNEL connection requested by the UICC.

Reference now is made in detail to the examples illustrated in the accompanying drawings and discussed below.

FIG. 1 illustrates an exemplary system 100 for handling an OPEN CHANNEL command from a UICC of a mobile device. As shown, the system 100 includes a mobile device 105, which includes a UICC module 120, which, in turn, includes configuration files and app software (e.g., applet) 125, which may include carrier specific files/data/software. The system 100 also includes a domain name service (DNS) server 150, and a Subscriber Identity Module Over The Air (SIMOTA) server farm 155 with multiple SIMOTA servers 160.1-$n$. The mobile device 105, DNS server 150, and SIMOTA servers 160.1-$n$ communicate with one another via a network 165. The network 165 may include one or more of a local area network, a wide area network, a wired network, a wireless network, a cellular network, a WiFi network, etc.

The network 165 might be implemented as a network conforming to the code division multiple access (CDMA) IS-95 standard, the 3rd Generation Partnership Project 2 (3GPP2) wireless IP network standard, the Evolution Data Optimized (EVDO) standard, the Global System for Mobile (GSM) communication standard, a time division multiple access (TDMA) standard or other standards used for public mobile wireless communications. The mobile device 105 may be capable of voice telephone, messaging, and/or data communications through the network 165. The mobile device 105 may be a data-only device (e.g., a tablet computer) capable of support messaging and/or data communication through the network 165 or a mobile phone capable of voice, text, and/or data communication through the network 165.

The network 165 may allow a user of the mobile device 105 to initiate and receive telephone calls with other users of mobile device(s) as well as through the public switched telephone network (PSTN). The network 165 may offer a variety of data services via the Internet, such as downloads, web browsing, email, etc. The mobile device 105 may receive (e.g., via the network 165) and execute applications written in various programming languages.

The network 165 can be implemented by a number of interconnected networks. Hence, the overall network 165 may include a number of radio access networks (RANs), as well as regional ground networks interconnecting a number of RANs and a wide area network (WAN) interconnecting the regional ground networks to core network elements. A regional portion of the network 165 may serve the mobile device 105 and may include one or more RANs and a regional circuit and/or packet switched network and associated signaling network facilities.

As shown, the mobile device 105 includes a processor 110, a network interface 115, a UICC 120, and a software memory 130. The processor 110 may include one or more processors, which may be arranged in one or more processing units, for example, a central processing unit (CPU), a graphics processing unit (GPU), etc. The network interface 115 may include an interface for connecting to the network 165 and may include the UICC 120 for identifying an account having permission to access the network 165. The UICC 120 may be Subscriber Identity Module (SIM) card and may identify the account by a mobile directory number (MDN), by an account number, or by any other identifier. The UICC 120 may include a memory and storage area to store configuration files and application software (e.g., applets) 125. Downloading information, for example update(s) or modification(s) to the config files & app software 125, to the UICC may be supported via applications managed by the SIMOTA servers **160.1-*n* or other trusted machines, for example Trusted Service Manger (TSM). The software memory 130 may include one or more of a cache unit, a storage unit, a long term memory, or a short term memory, which stores data and/or instructions. As shown, the software memory 130 stores a UICC device driver 135 and a DNS resolver 140. The software memory 130** may also store other application(s) or file(s), for example, photograph(s), video(s), word processing file(s), email message(s), text message(s), etc.

The UICC device driver 135 includes software instructions for the mobile device 105 to interface with the UICC 120 and control operation of the UICC 120. For example, the UICC device driver 135 may store software instructions for the mobile device 105 to implement the process 200 described below in conjunction with FIG. 2. The DNS resolver 140 includes software instructions to resolve a URL to an IP address.

The SIMOTA server farm 155 includes multiple SIMOTA servers **160.1-*n* that store data and instructions for installing and updating information within the UICC 120, such as the config files & app software 125. The SIMOTA servers 160.1-*n* may communicate with the mobile device 105 and the UICC 120 via the network 165**.

According to some schemes, the UICC 120 of the mobile device 105 stores an IP address of one or more of the SIMOTA servers **160.1-*n* that are accessed by the mobile device 105 for installing or updating the config files & app software 125, which is stored in the UICC 120. For example, the UICC 120 may store the IP addresses of SIMOTA servers 160.1 and 160.2. However, in some circumstances, the connection of the mobile device 105 with the SIMOTA servers 160.1 and 160.2 may not be optimal. For example, the connection of the mobile device 105 with the SIMOTA servers 160.1 and 160.2 may be slower that connection of the mobile device 105 with other SIMOTA servers. This may be due to the servers 160.1 and 160.2 being temporarily not operational, offline, overloaded, geographically distant from the mobile device 105, etc. Geographic distance may be an issue because a mobile device may use fewer network resources and have a greater network speed when accessing a geographically proximate server than when accessing a geographically distant server. For example, a mobile device in Connecticut may use fewer network resources and a greater network speed when accessing a server in New York City than when accessing a server in Los Angeles. In these circumstances, connecting to a different SIMOTA server in the SIMOTA server farm 155 such as, for example, SIMOTA server 160.3, which may be lightly loaded and/or geographically proximate to the mobile device 105, may be desirable. Under the existing schemes, modifying the UICC 120 to cause the mobile device 105 to connect to the SIMOTA server 160.3 instead of one of the SIMOTA servers 160.1 or 160.2 may be cumbersome, as such a modification would require notifying the UICC 120 that its stored SIMOTA server IP address may be changed, providing a new SIMOTA server IP address to the UICC 120, and storing the new SIMOTA server IP address in the UICC 120. Thus, the subject technology describes new techniques for dynamically determining access to SIMOTA server(s) for purposes of obtaining UICC updates related to the config files & app software 125**.

According to some implementations of the subject technology, the processor 110 of the mobile device 105 receives a connection request requesting connection to the SIMOTA server farm 155 for installing or updating content of the UICC 120, for example, the config files & app software 125. The connection request may be initiated at the UICC 120 and may include a URL of the SIMOTA server farm 155, for example, simota.xyz-telephone-company.com. The connection request may be an OPEN CHANNEL command from the UICC 120.

Upon receiving the connection request, the processor 110 may execute the connection request using DNS resolver 140 and select IPv6 destination address/IPv4 destination address based on DNS responses and destination address selection criteria, for example, as specified in RFC-3484, which is incorporated herein by reference in its entirety. The processor 110 determines whether the mobile device 105 is capable of resolving a URL to a routable IP address (e.g., via the local DNS resolver 140) and connecting to the SIMOTA server farm 155 via the URL. For example, a terminal profile of the mobile device 105 indicates that the mobile device 105 uses the DNS resolving capability of the mobile device (e.g., the local DNS resolver 140) for connection requests initiated at the UICC, and that the mobile device 105 is capable of resolving the URL to the routable IP address.

Based on URL-type requested in OPEN CHANNEL, the local DNS resolver 140 of mobile device 105 may send a DNS request to the DNS server 150 to resolve DNS-name (e.g., simota.xyz-telephone-company.com) to IP address, for example, as specified in RFC-1034/RFC-1035, both of which are incorporated herein by reference. If URL-type of URL-IPv6 or URL-IPv4v6 is requested then mobile device 105 and local DNS resolver 140 may support IPv6 DNS Extensions, for example, as specified in RFC-1886/RFC-3596/RFC-4472, all of which are incorporated herein by reference. If the DNS server 150 returns an IPv6-address for URL/DNS-name then the IPv6 server-address may be used.

In either case, the processor 110 may use the IP address obtained from the DNS resolver 140 to connect to the SIMOTA server **160.*k* in the SIMOTA server farm 155. Using the established connection with the SIMOTA server 160.*k*, the SIMOTA server 160.*k* installs or updates the config files & app software 125 in the UICC 120. In one implementation, the UICC 120 may store the resolved SIMOTA IP address into the UICC 120. In another implementation, the UICC 120 may not store the resolved IP address in the UICC 120 and the IP address of the DNS server 150**. Advantages of storing the resolved IP address include an alternative/fallback mechanism when the URL-based process of connecting to the SIMOTA fails. Advantages of not storing the resolved IP address include an opportunity to resolve the URL to an IP address of a different, more efficient server each time access to the server is required.

Upon determining that the mobile device 105 and the UICC 120 are incapable of resolving the URL to the routable IP address, the UICC 120 connects to SIMOTA server 160.*m* using a previously stored IP on the UICC 120. The previously stored IP address may correspond to an IP address of a specific SIMOTA server in the SIMOTA farm 155.

Figure 2:
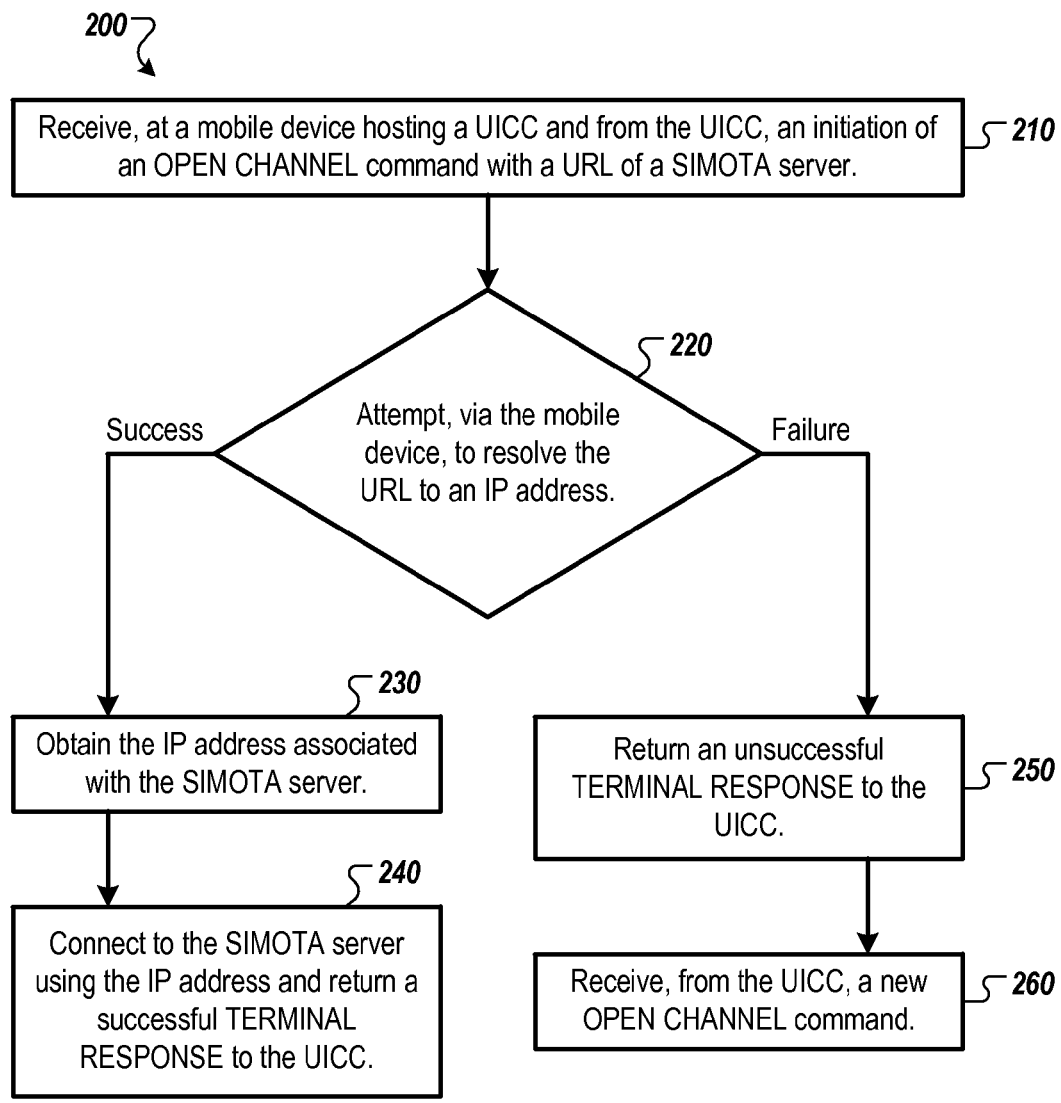
FIG. 2 illustrates an exemplary process for handling an OPEN CHANNEL command from a UICC of a mobile device.

FIG. 2 illustrates an exemplary process 200 for handling an OPEN CHANNEL command from a UICC of a mobile device. The process 200 begins at step 210, where a mobile device (e.g., mobile device 105) hosting a UICC (e.g., UICC 120) receives, from the UICC, an initiation of an OPEN CHANNEL command with a URL of a SIMOTA server (e.g., one of the servers in SIMOTA server farm 155). The UICC may store one or more configuration files or an applet (e.g., config files & app software 125). The one or more configuration files or the applet may include the URL of the SIMOTA server and/or a specific IP address of the SIMOTA server.

A destination address value of the OPEN CHANNEL command may indicate the URL of the SIMOTA server. The destination address value may include a first byte indicating an address tag; a second byte indicating a length (X) of the address, a third byte indicating a type of address, and X-1 bytes indicating the address. The address type may be a URL type and the address may be the URL of the SIMOTA server. Examples of the destination address value are illustrated in Table 1 and Table 2.

Prior to step 210, during mobile device initialization, the mobile device may inform the UICC that the mobile device is capable of resolving URL(s) to IP address(es). The mobile device may determine that the mobile device is capable of resolving the URL to the IP address based on an operating system application programming interface (API) of the mobile device. The operating system API may store an indication that the mobile device is capable of resolving URLs to IP addresses. For example, if the mobile device has an Android® operating system, the Android® API indicates that the mobile device is capable of resolving URLs to IP addresses. If the mobile device has an IOS® operating system, the IOS® AIP indicates that the mobile device is capable of resolving URLs to IP addresses.

In step 220, the mobile device attempts to resolve the URL to an IP address. For example, the mobile device may access a DNS resolver (e.g., DNS resolver 140) at the mobile device and attempt, via the DNS resolver, to resolve the URL to an IP address. The DNS resolver may provide the URL to a DNS server (e.g., DNS server 150) and receive, from the DNS server, the IP address to which the URL resolves. If the mobile device succeeds at resolving the URL to the IP address, the process 200 continues to step 230. If the mobile device fails at resolving the URL to the IP address, for example, due to a failure or inaccessibility of the DNS resolver or the DNS server, the process 200 continues to step 250.

In step 230, if the mobile device succeeds at resolving the URL to the IP address, the mobile device obtains the IP address associated with the SIMOTA server (e.g., SIMOTA server 160.*k*). The IP address associated with the SIMOTA server may be obtained, at the mobile device, from the DNS resolver or the DNS server.

In step 240, the mobile device connects to the SIMOTA server using the IP address. The mobile device returns a successful TERMINAL RESPONSE to the UICC. The successful TERMINAL RESPONSE may indicate, to the UICC, that the connection to the SIMOTA server using the URL was successful. The connection with the SIMOTA server may be used to update information stored by the UICC, for example, the one or more configuration files or the applet (e.g., config files & app software 125 stored by UICC 120). After step 240, the process 200 ends.

In step 250, if the mobile device fails at resolving the URL to the IP address, the mobile device returns an unsuccessful TERMINAL RESPONSE to the UICC. The unsuccessful TERMINAL RESPONSE indicates to the UICC that the connection to the SIMOTA server using the URL was unsuccessful. In response, the UICC may deal with the connection failure.

In step 260, the mobile device may receive a new request from UICC. If the specific IP address of the SIMOTA server is stored in the UICC, the new request may include a new OPEN CHANNEL command with the specific IP address of the SIMOTA server (e.g., SIMOTA server 160.*k*). Alternatively, if the specific IP address of the SIMOTA server is not stored in the UICC, the UICC may deal with the connection failure in another manner, without providing a new OPEN CHANNEL command, for example, by reattempting to connect using the URL at a later time. After step 260, the process 200 ends.

Figure 3:
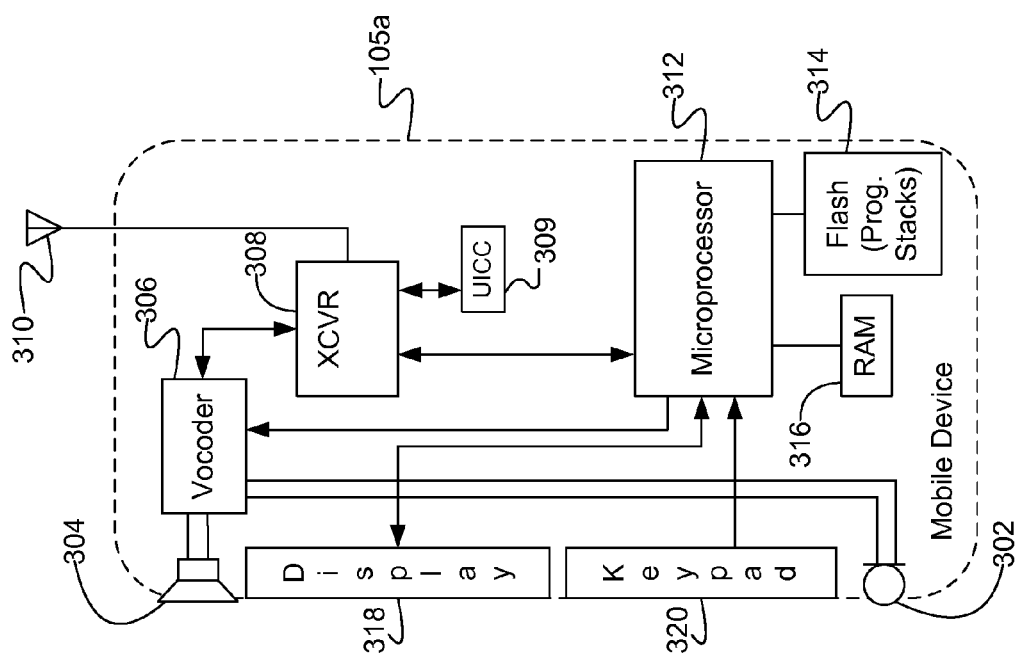
FIG. 3 is a high-level functional block diagram of an exemplary non-touch type mobile device, which may utilize the UICC polling mechanism and management service.

FIG. 3 provides a block diagram illustration of an exemplary non-touch type mobile device 105*a*, which may correspond to the mobile device 105. Although the mobile device 105*a* may be a smart-phone or may be incorporated into another device, such as a personal digital assistant (PDA) or the like, for discussion purposes, the illustration shows the mobile device 105*a* is in the form of a handset. The handset embodiment of the mobile device 105*a* functions as a normal digital wireless telephone station. For that function, the mobile device 105*a* includes a microphone 302 for audio signal input and a speaker 304 for audio signal output. The microphone 302 and speaker 304 connect to voice coding and decoding circuitry (vocoder) 306. For a voice telephone call, for example, the vocoder 306 provides two-way conversion between analog audio signals representing speech or other audio and digital samples at a compressed bit rate compatible with the digital protocol of wireless telephone network communications or voice over packet (Internet Protocol) communications.

For digital wireless communications, the mobile device 105*a* also includes at least one digital transceiver (XCVR) 308. As shown, the transceiver 308 is connected with the UICC 309 via an interface. Alternatively, the UICC 309 may be internal to the transceiver 308. The UICC 309 may correspond to the UICC 120 shown in FIG. 1. The mobile device 105*a* may be configured for digital wireless communications using one or more of the common network technology types. The concepts discussed here encompass embodiments of the mobile device utilizing any digital transceivers that conform to current or future developed digital wireless communication standards. The mobile device may also be capable of analog operation via a legacy network technology.

The transceiver 308 provides two-way wireless communication of information, such as vocoded speech samples and/or digital information, in accordance with the technology of the network 165. The transceiver 308 also sends and receives a variety of signaling messages in support of the various voice and data services provided via the mobile device 105*a* and the communication network. Each transceiver 308 connects through RF send and receive amplifiers (not separately shown) to an antenna 310. The transceiver may also support various types of mobile messaging services, such as short message service (SMS), enhanced messaging service (EMS) and/or multimedia messaging service (MMS).

The mobile device 105*a* includes a display 318 for displaying messages, menus or the like, call related information dialed by the user, calling party numbers, etc. A keypad 320 enables dialing digits for voice and/or data calls as well as generating selection inputs, for example, as may be keyed-in by the user based on a displayed menu or as a cursor control and selection of a highlighted item on a displayed screen. The display 318 and keypad 320 are the physical elements providing a textual or graphical user interface. Various combinations of the keypad 320, display 318, microphone 302 and speaker 304 may be used as the physical input output elements of the graphical user interface (GUI), for multimedia (e.g., audio and/or video) communications. Of course other user interface elements may be used, such as a trackball, as in some types of PDAs or smart phones.

In addition to normal telephone and data communication related input/output (including message input and message display functions), the user interface elements also may be used for display of menus and other information to the user and user input of selections, including any needed during handling the OPEN CHANNEL command from the UICC of the mobile device.

A microprocessor 312 serves as a programmable controller for the mobile device 105*a*, in that it controls all operations of the mobile device 105*a* in accordance with programming that it executes, for all normal operations, and for operations involved in the handling the OPEN CHANNEL command from the UICC of the mobile device procedure under consideration here. In the example, the mobile device 105*a* includes flash type program memory 314, for storage of various "software" or "firmware" program routines and mobile configuration settings, such as mobile directory number (MDN) and/or mobile identification number (MIN), etc. The flash type program memory 314 stores programmed instructions for handling the OPEN CHANNEL command from the UICC of the mobile device, as described herein. The mobile device 105*a* may support new logic for using a DNS resolver of the mobile device for the purpose of processing OPEN CHANNEL command(s) from the UICC. The mobile device 105*a* may also include a non-volatile random access memory (RAM) 316 for a working data processing memory. Of course, other storage devices or configurations may be added to or substituted for those in the example. In a present implementation, the flash type program memory 314 stores firmware such as a boot routine, device driver software, an operating system, call processing software and vocoder control software, and any of a wide variety of other applications, such as client browser software and short message service software. The memories 314, 316 also store various data, such as telephone numbers and server addresses, downloaded data such as multimedia content, and various data input by the user. Programming stored in the flash type program memory 314, sometimes referred to as "firmware," is loaded into and executed by the microprocessor 312.

As outlined above, the mobile device 13*a* includes a processor, and programming stored in the flash memory 314 configures the processor so that the mobile device is capable of performing various desired functions, including in this case the functions involved in the technique for handling the OPEN CHANNEL command from the UICC of the mobile device.

Figure 4:
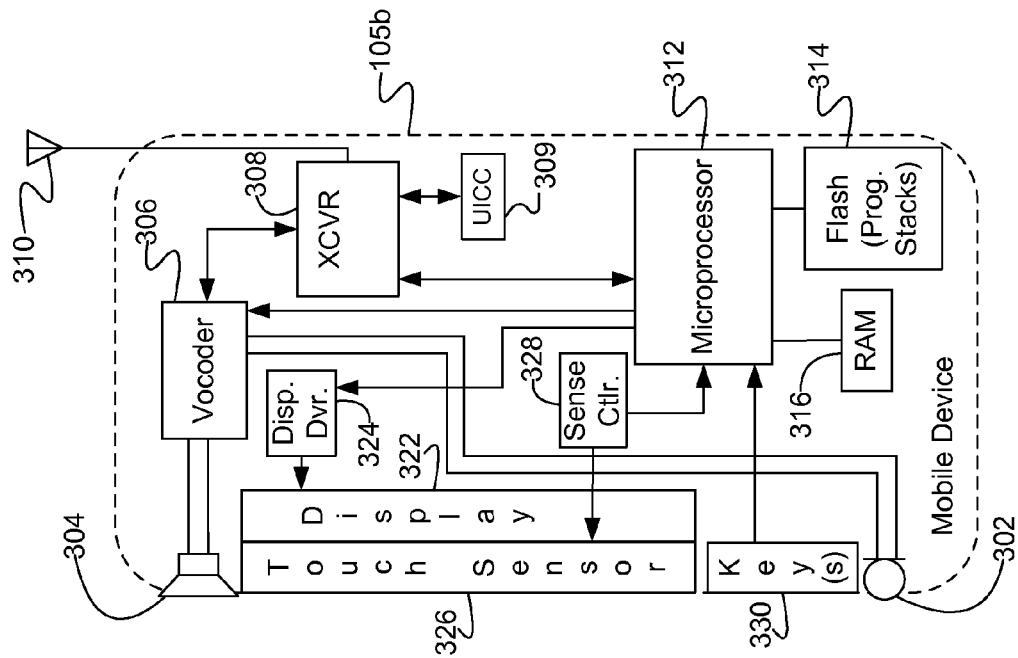
FIG. 4 is a high-level functional block diagram of an exemplary touch screen type mobile device, which may utilize the UICC polling mechanism and management service.

For purposes of such a discussion, FIG. 4 provides a block diagram illustration of an exemplary touch screen type mobile device 105*b*. Although possible configured somewhat differently, at least logically, a number of the elements of the exemplary touch screen type mobile device 105*b* are similar to the elements of mobile device 105*a*, and are identified by like reference numbers in FIG. 4. For example, the touch screen type mobile device 105*b* includes a microphone 302, speaker 304 and vocoder 306, for audio input and output functions, much like in the earlier example. The mobile device 105*b* also includes at least one digital transceiver (XCVR) 308, for digital wireless communications, although the mobile device 105*b* may include an additional digital or analog transceiver. The concepts discussed here encompass embodiments of the mobile device 105*b* utilizing any digital transceivers that conform to current or future developed digital wireless communication standards. As in the mobile device 105*a*, the transceiver 308 provides two-way wireless communication of information, such as vocoded speech samples and/or digital information, in accordance with the technology of the network 165. The transceiver 308 also sends and receives a variety of signaling messages in support of the various voice and data services provided via the mobile device 105*b* and the network 165. Each transceiver 308 connects through RF send and receive amplifiers (not separately shown) to an antenna 310. The transceiver may also support various types of mobile messaging services, such as short message service (SMS), enhanced messaging service (EMS) and/or multimedia messaging service (MMS).

As in the example of the mobile device 105*a*, a microprocessor 312 serves as a programmable controller for the mobile device 105*b*, in that it controls all operations of the mobile device 105*b* in accordance with programming that it executes, for all normal operations, and for operations involved in the handling the OPEN CHANNEL command from the UICC of the mobile device procedure under consideration here. The mobile device 105*b* may support new logic for using a DNS resolver of the mobile device for the purpose of processing OPEN CHANNEL command(s) from the UICC. In the example, the mobile device 105*b* includes flash type program memory 314, for storage of various program routines and mobile configuration settings. The mobile device 105*b* may also include a non-volatile random access memory (RAM) 316 for a working data processing memory. Of course, other storage devices or configurations may be added to or substituted for those in the example. Hence, outlined above, the mobile device 105*b* includes a processor, and programming stored in the flash memory 314 configures the processor so that the mobile device is capable of performing various desired functions, including in this case the functions involved in the technique for handling the OPEN CHANNEL command from the UICC of the mobile device.

In the example of FIG. 4, the user interface elements included a display and a keypad. The mobile device 105*b* may have a limited number of key(s) 330, but the user interface functions of the display and keypad are replaced by a touchscreen display arrangement. At a high level, a touchscreen display is a device that displays information to a user and can detect occurrence and location of a touch on the area of the display. The touch may be an actual touch of the display device with a finger, stylus or other object, although at least some touchscreens can also sense when the object is in close proximity to the screen. Use of a touchscreen display as part of the user interface enables a user to interact directly with the information presented on the display.

Hence, the exemplary mobile device 105*b* includes a display 322, which the microprocessor 312 controls via a display driver 324, to present visible outputs to the device user. The mobile device 105*b* also includes a touch/position sensor 326. The sensor 326 is relatively transparent, so that the user may view the information presented on the display 322. A sense circuit 328 sensing signals from elements of the touch/position sensor 326 and detects occurrence and position of each touch of the screen formed by the display 322 and sensor 326. The sense circuit 328 provides touch position information to the microprocessor 312, which can correlate that information to the information currently displayed via the display 322, to determine the nature of user input via the screen.

The display 322 and touch sensor 326 (and possibly one or more keys 330, if included) are the physical elements providing the textual and graphical user interface for the mobile device 105b. The microphone 302 and speaker 304 may be used as user interface elements for audio input and output.

The structure and operation of the mobile devices 105a and 105b, as outlined above, were described to by way of example, only.

In sum, the subject technology provides techniques for handling an OPEN CHANNEL command from a universal integrated circuit card (UICC) of a mobile device. A mobile device hosting a UICC may receive, from the UICC, an initiation of an OPEN CHANNEL command with a uniform resource locator (URL) of a subscriber identity module over the air (SIMOTA) server. The mobile device may signal for attempting to resolve the URL to an Internet Protocol (IP) address. Upon successfully resolving the URL to the IP address, the mobile device may obtain the IP address associated with the SIMOTA server, connect to the SIMOTA server using the IP address, and return a successful TERMINAL RESPONSE to the UICC. Upon failing to resolve the URL to the IP address, the mobile device may return an unsuccessful TERMINAL RESPONSE to the UICC.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
    receiving, at a mobile device hosting a universal integrated circuit card (UICC) and from the UICC, an initiation of an OPEN CHANNEL command with a uniform resource locator (URL) of a subscriber identity module over the air (SIMOTA) server;
    signaling for attempting to resolve the URL to an Internet Protocol (IP) address;
    upon successfully resolving the URL to the IP address:
        obtaining the IP address associated with the SIMOTA server;
        connecting to the SIMOTA server using the IP address; and
        returning a successful TERMINAL RESPONSE to the UICC; and
    upon failing to resolve the URL to the IP address:
        returning an unsuccessful TERMINAL RESPONSE to the UICC.

2. The method of claim 1, further comprising:
    upon failing to resolve the URL to the IP address and in response to the UICC receiving the unsuccessful TERMINAL RESPONSE, receiving, at the mobile device and from the UICC, a new OPEN CHANNEL command with a specific IP address of the SIMOTA server.

3. The method of claim 1, further comprising:
    informing the UICC, via the mobile device, that the mobile device includes functionality to resolve URLs to IP addresses.

4. The method of claim 3, further comprising:
    determining that the mobile device includes the functionality to resolve URLs to IP addresses based on an operating system application programming interface (API) of the mobile device.

5. The method of claim 1, wherein signaling for attempting to resolve the URL to the IP address comprises:
    accessing a domain name service (DNS) resolver at the mobile device; and
    attempting, via the DNS resolver, to resolve the URL to the IP address.

6. The method of claim 5, wherein attempting, via the DNS resolver, to resolve the URL to the IP address comprises:
    providing, over a network and via the DNS resolver, the URL to a remote DNS server; and
    receiving, at the DNS resolver and from the remote DNS server, the IP address.

7. The method of claim 1, further comprising:
    storing, at the UICC, one or more configuration files or an applet, the one or more configuration files or the applet comprising the URL of the SIMOTA server and a specific IP address of the SIMOTA server, wherein the specific IP address of the SIMOTA server is used to connect to the SIMOTA server upon failing to resolve the URL to the IP address.

8. A non-transitory machine-readable medium comprising instructions which, when executed by a mobile device, cause the mobile device to:
    receive, at the mobile device hosting a universal integrated circuit card (UICC) and from the UICC, an initiation of an OPEN CHANNEL command with a uniform resource locator (URL) of a subscriber identity module over the air (SIMOTA) server;
    signal for attempting to resolve the URL to an Internet Protocol (IP) address;
    upon successfully resolving the URL to the IP address:
        obtain the IP address associated with the SIMOTA server;
        connect to the SIMOTA server using the IP address; and
        return a successful TERMINAL RESPONSE to the UICC; and
    upon failing to resolve the URL to the IP address:
        return an unsuccessful TERMINAL RESPONSE to the UICC.

9. The non-transitory machine-readable medium of claim 8, further comprising instructions which, when executed by the mobile device, cause the mobile device to:
    upon failing to resolve the URL to the IP address and in response to the UICC receiving the unsuccessful TERMINAL RESPONSE, receive, at the mobile device and from the UICC, a new OPEN CHANNEL command with a specific IP address of the SIMOTA server.

10. The non-transitory machine-readable medium of claim 8, further comprising instructions which, when executed by the mobile device, cause the mobile device to:
    inform the UICC, via the mobile device, that the mobile device includes functionality to resolve URLs to IP addresses.

11. The non-transitory machine-readable medium of claim 10, further comprising instructions which, when executed by the mobile device, cause the mobile device to:
    determine that the mobile device includes the functionality to resolve URLs to IP addresses based on an operating system application programming interface (API) of the mobile device.

12. The non-transitory machine-readable medium of claim 8, wherein the instructions to signal for attempting, via the mobile device, to resolve the URL to the IP address comprise instructions which, when executed by the mobile device, cause the mobile device to:
    access a domain name service (DNS) resolver at the mobile device; and
    attempt, via the DNS resolver, to resolve the URL to the IP address.

13. The non-transitory machine-readable medium of claim 12, wherein the instructions to attempt, via the DNS resolver, to resolve the URL to the IP address comprise instructions which, when executed by the mobile device, cause the mobile device to:
    provide, over a network and via the DNS resolver, the URL to a remote DNS server; and
    receive, at the DNS resolver and from the remote DNS server, the IP address.

14. The non-transitory machine-readable medium of claim 8, further comprising instructions which, when executed by the mobile device, cause the mobile device to:
    store, at the UICC, one or more configuration files or an applet, the one or more configuration files or the applet comprising the URL of the SIMOTA server and a specific IP address of the SIMOTA server, wherein the specific IP address of the SIMOTA server is used to connect to the SIMOTA server upon failing to resolve the URL to the IP address.

15. A mobile device comprising:
    processing hardware;
    a universal integrated circuit card (UICC); and
    a memory comprising instructions which, when executed by the processing hardware, cause the processing hardware to:
        receive, from the UICC, an initiation of an OPEN CHANNEL command with a uniform resource locator (URL) of a subscriber identity module over the air (SIMOTA) server;
        signal for attempting to resolve the URL to an Internet Protocol (IP) address;
        upon successfully resolving the URL to the IP address:
            obtain the IP address associated with the SIMOTA server;
            connect to the SIMOTA server using the IP address; and
            return a successful TERMINAL RESPONSE to the UICC; and
        upon failing to resolve the URL to the IP address:
            return an unsuccessful TERMINAL RESPONSE to the UICC.

16. The mobile device of claim 15, wherein the UICC lacks domain name service (DNS) resolver functionality and does not store any IP addresses associated with the SIMOTA server or a DNS server.

17. The mobile device of claim 15, the memory further comprising instructions which, when executed by the processing hardware, cause the processing hardware to:
    upon failing to resolve the URL to the IP address and in response to the UICC receiving the unsuccessful TERMINAL RESPONSE, receive, at the mobile device and from the UICC, a new OPEN CHANNEL command with a specific IP address of the SIMOTA server.

18. The mobile device of claim 15, the memory further comprising instructions which, when executed by the processing hardware, cause the processing hardware to:
    inform the UICC that the mobile device includes functionality to resolve URLs to IP addresses.

19. The mobile device of claim 18, the memory further comprising instructions which, when executed by the mobile device, cause the mobile device to:
    determine that the mobile device includes the functionality to resolve URLs to IP addresses based on an operating system application programming interface (API) of the mobile device.

20. The mobile device of claim 15, wherein the instructions to signal for attempting to resolve the URL to the IP address comprise instructions which, when executed by the processing hardware, cause the processing hardware to:
    access a domain name service (DNS) resolver at the mobile device; and
    attempt, via the DNS resolver, to resolve the URL to the IP address.

* * * * *